April 13, 1965 L. A. WILSON 3,177,967

TAXI CONTROL SYSTEMS

Filed Sept. 5, 1962

INVENTOR.
LOUIS A. WILSON

United States Patent Office 3,177,967
Patented Apr. 13, 1965

3,177,967
TAXI CONTROL SYSTEMS
Louis A. Wilson, 15731 Stulman Ave., Gardena, Calif.
Filed Sept. 5, 1962, Ser. No. 221,550
6 Claims. (Cl. 180—82)

This invention relates generally to taxicabs and more specifically to an electronic taxi control system which functions to prevent the taxi driver from transporting passengers when the taximeter is not registering.

Another purpose of this invention is to provide a taxi control system which is tamper-proof and cannot be defeated by the driver.

Another purpose of this invention is to provide a taxi control system that is simple to install and maintain.

Another purpose of this invention is to provide a taxi control system that allows the driver to bring the cab in to the home station when tampering or other trouble occurs, and prevent having to send out a maintenance man for repairs.

It is known by this inventor that several systems have been devised to accomplish the functions of this invention. These systems, however, have several disadvantages which are overcome by this invention as will be shown later in this specification.

One of the major requirements of a taxi control system of this type is to provide a means of detecting the presence of a passenger anywhere in the passenger area of the taxi and at the same time make the said detector means trouble free and tamper proof.

One system known to this inventor utilizes mechanical switches that are attached on the bottom side of the taxi seats and are actuated when the seat is occupied. Several inherent disadvantages of using this type of switch can be shown by briefly analyzing the problem. First, the area to be monitored includes all of the rear seat and the passenger side of the front seat. To monitor this area with the required sensitivity necessitates several switches strategically located beneath the seats. There are several reasons why this is impractical. One reason is that because of the varying configuration of the taxi seats, it is difficult to install such a switch; secondly, all of the switches involved require periodic adjustment if the required sensitivity is to be obtained and maintained; thirdly, since the seats have to be removed occasionally to retrieve articles lost by passengers, the switches are readily available to the driver to be tampered with and fourthly, by bouncing hard upon the seat, the switches can be easily broken.

Another system known to this inventor uses a pad installed below the seat covers that utilizes metal strips, separated by foam rubber, with many contacts spread over the passenger seat area that touch when the seat is occupied. Here again, adjustment becomes a problem since the distance between the switch contacts is an important factor if the required sensitivity is obtained. This makes installation difficult since the tightness of the seat covers becomes a factor. Also, after some use, these contacts often stick in some cases and become insensitive in other. This means that the seat covers must be removed to make adjustments.

It it is kept in mind that for taxi operation purposes, where many passengers are hauled every day, a practical passenger detection system should be trouble free, tamperproof, easily installed and maintained, and most of all capable of positive detection anywhere in the passenger seating area, it can be seen that the switches described above have several shortcomings.

A second major problem involved in a taxi control system of this type is to make the system tamper proof, since it is valueless if it can be defeated by the driver. Other existing systems known to this inventor use multiconductor cables and fuses in a locked box to accomplish this function. The multiconductor cables make installation difficult; and the fuses, if blown, make the auto inoperative and must be replaced before the car will run. In the second case, a maintenance man has to go out and repair the system when it becomes inoperative away from home station. If the driver were allowed to perform this maintenance, the system would not be tamper proof.

As this invention is described below, it will be shown that the inherent disadvantages pointed out above (difficult to install; difficult to adjust and maintain; complicated tamper circuits; and require immediate service when system becomes inoperative) are overcome by this invention.

Figure 1:
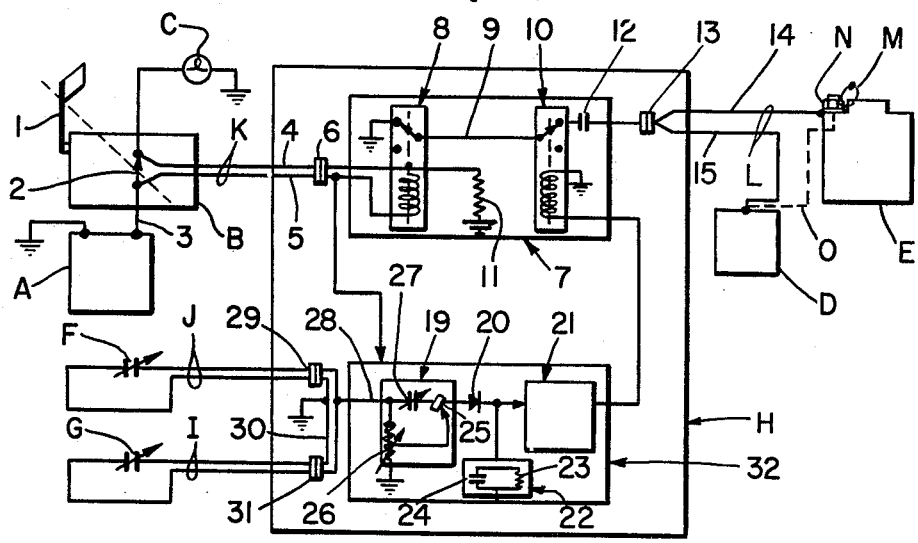
FIGURE 1 is a schematic diagram showing the taxi control system of the invention.

FIGURE 1 is a functional schematic diagram showing the taxi control system interconnected with some of the standard taxi equipment. Items A, B, C, D, and E represent the standard taxi equipment which consist of: the taxi meter B which records the fare, paid miles and number of trips; the top lights C, which are located on top of the taxi and indicate that the taxi is available for hire; the auto battery A; the ignition coil E; and the distributor D.

Before the taxi control system is installed, the standard taxi equipment functions as follows. The taximeter B contains a switch 2 that is controlled by the meter flag 1. When the meter B is not recording (the flag 1 is up), the switch 2 is closed and current is transferred from the battery A through wire 3 and the switch 2 to the top light C. The light comes on indicating that the taxi is for hire.

Items D and E represent part of the automobile ignition system. The distributor D functions to provide a pulsating D.C. voltage required by the coil E for ignition circuit operation. Before the taxi control system is installed, current between the coil and distributor is transferred through wire 0; after the control system is installed, this current is transferred through wires 14 and 15 of cable L. It will now be explained how the taxi control system interoperates with the automobile circuits just described to prevent taxi operation when a passenger is in the cab and the taximeter is not registering.

Beginning with the taxi control circuit 7, when relays 8 and 10 are both deenergized as shown, the pulsating D.C. voltage required for the ignition circuit operation is grounded through cable L, connector 13, condenser 12, relay 10 contacts, wire 9, and relay 8 contacts. When this condition exists the auto will not run. If, however, one or both of the relays 8 or 10 are energized, the kill circuit is broken and the auto will run.

Relay 8 is controlled by the switch 2 in the taximeter B. When the taximeter is not registering (flag 1 is up) the switch 2 is closed as shown and the voltage from the battery A is supplied through wire 3, wires 4 and 5 of cable K, and connector 6 to both ends of relay 8 coil. Thus, the relay is deenergized when the taximeter is not registering since the voltage potential at both ends of the coils is the same. When the taximeter B is registering (flag 1 is down) switch 2 is opened and the battery potential is removed from wire 4. The relay 8 is then energized by the battery potential at wire 5 across the relay coil and resistor 11. Relay 10, which is controlled by the passenger detector circuit 32 is deenergized as shown when a passenger is detected. The passenger detector circuits will be explained later.

From the above discussion, it can be seen that when the taximeter is not recording and a passenger is detected, both relay 8 and 10 are deenergized as shown and the auto will not run. It will now be shown how the taxi control circuit is tamper proof, and also how the cab can be brought in for repairs if troubles should arise while the cab is out on a run.

The cables K and L are two conductor cables with plugs on one end that connect inside the control unit H at connectors 6 and 13. The control unit is locked so the plugs cannot be removed unless the lock is broken. The opposite end of cable K is connected inside the taximeter B across switch 2. The taximeter is required by law to be locked. One end of the cable L is connected to coil E and secured with a special nut N which has a hole in its side, and lockwire M which is run through the hole in the nut and around wire 14 and sealed. The cable cannot be removed unless the seal is broken. With the taximeter and control unit sealed, and with cable L locked to the ignition coil, the only way the control circuit can be disconnected by the driver is by cutting cable K or cable L. Since tampering is sometimes attempted by cutting or shorting the cables, the circuit is made tamper proof as follows. If cable K is cut, the power required to energize relays 8 and 10 is removed from the control unit and the auto will not run. If the cable is short circuited, the potential at both ends of the coil of relay 8 will be the same and the relay will remain deenergized; the car will not run then when a passenger is seated and relay 10 is deenergized.

If cable L is cut, the pulsating do current path between the coil and distributor is broken and the auto will not run. If the cable is short circuited, the circuit will be unchanged since wires 14 and 15 are already shorted at plug 13.

One other way a driver sometimes attempts to defeat the system is to burn out the contacts of relay 8 or relay 10 by applying the battery voltage to wire 14 or 15 at the coil or distributor. This action is defeated by condenser 12 since it will not pass D.C. voltage.

In a previous discussion it was explained that any time one of the relays 8 or 10 is energized, the auto will run. Reexamination of the meter B circuit shows that relay 8 is energized when the meter flag is down and the meter is registering. It can now be seen that if the transistorized passenger detector circuit fails and relay 10 becomes deenergized, the cab can be brought in for repairs by turning the taximeter on. Thus, no service calls are required if the system should malfunction while the cab is making a run.

The operation of the passenger detector circuits 32 and condensers F and G will now be explained. Power for the transistorized detector circuit is supplied continuously from the battery A through wires 3 and 5, and connector 6. The detector circuit consists of an oscillator 19, a rectifier circuit 20, a relay driver circuit 21, and a delay circuit 22. The detector circuit is arranged so that when the oscillators is on, its output is rectified by rectifier 20 and used to turn on the transistorized relay driver circuit 21 which in turn energizes relay 10. The relay driver 21 is a basic D.C. amplifier and needs no further description. It will now be shown that the relay is energized when the condenser seat pads F and G are unoccupied and deenergized when either or both seat pads are occupied.

The oscillator 19 shows only the parts of the circuit necessary to understand the detector circuit operation. It is common knowledge in the field of electronics that an amplifier becomes an oscillator when a suitable portion of the current through the amplifier is fed back to the input of the stage. In the case of the oscillator shown, part of the current through transistor 25 is fed back from the emitter to the base through coil 26 and trimmer condenser 27. When the capacity of trimmer condenser 27 is increased sufficiently, the feedback starts the oscillator; if the feedback is decreased the oscillator will stop. When the seat condsensers F and G are connected as by increasing the capacity of either or both of the seat condensers since this increased capacity will allow more of the feedback to go to ground through wire 28, connector 29 or 31, and cable I and J depending on which seat pad is occupied.

It is known to this inventor that capacity controlled oscillator means exist to detect the presence of people; however, it will now be shown that this circuit differs from other existing circuits in performing this function.

It is commonly known in the field of electronics that the capacity of a condenser can be changed by either changing the dielectric between the plates or by changing the plate configuration. Other existing body detector circuits utilize the person's body to change the air dielectric between the condenser plates. This principle cannot be utilized in this invention because humidity changes, which are extreme in some parts of the country, will also change the dielectric between the plates. For this reason the condenser used in this invention must minimize the capacity change due to a dielectric change and utilize the change due to a change in plate configuration.

Figure 2:
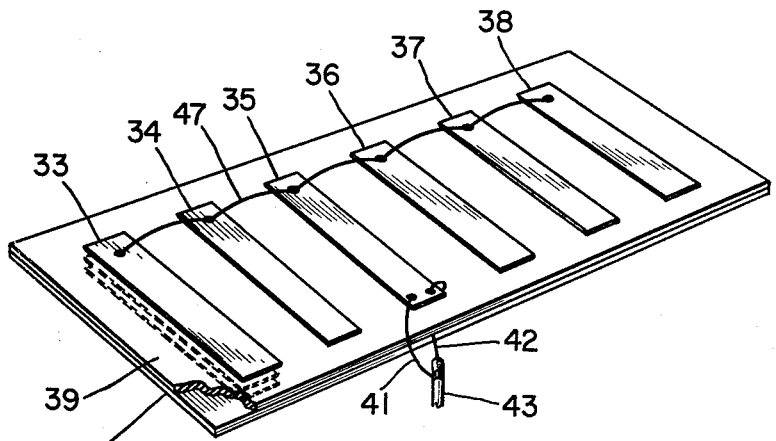
FIGURE 2 is a perspective view of the seat pad condenser structure.

The condenser used in this invention is illustrated in FIGURE 2. The condenser is made in a pad configuration as shown in view A of FIGURE 2. The condenser dielectric, 39 and 40 is made of two pads of compressible material such as foam rubber. The condenser plates, 6 of which are shown by 33 through 38, are made of a flexible metal such as spring brass.

The six plates shown are tied together by wire 47 and glued to the compressible pad 39. Directly below the pad 39 are 6 more plates which are tied together and arranged in a similar configuration to the top plates. This second set of plates are glued to the compressible pad 40. Glued to the bottom of the compressible pad 40 are a third set of 6 plates which are tied together and arranged in a similar configuration to the first and second sets.

Figure 3:
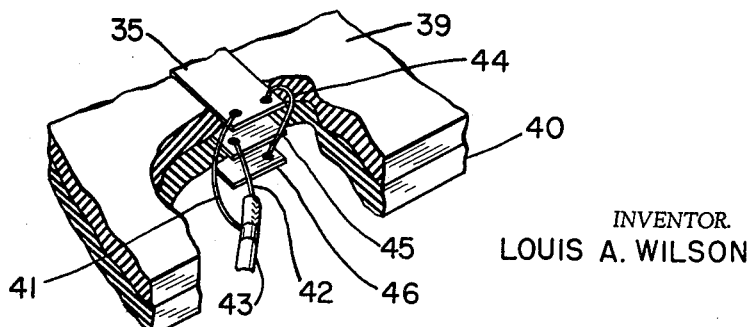
FIGURE 3 is a cut away view of the center section of the seat pad showing a detail of the plate arrangement.

FIGURE 3 is a cut away view of the center section of the seat pad which shows a detail view of the plate arrangement. The top plate 35 and the bottom plate 46 are tied together by wire 44. The top plate is also connected by wire 41 to the shield of cable 43. The cable 43 represents cables I and J in FIGURE 1. The shield wires are grounded at the control unit by wire 30. From the above discussion, it can be seen that the top set of plates, 33 through 38, and the bottom set of plates which are glued to the bottom of pad 40 are all placed at ground potential by wires 44 and 41, and the shield of cable 43. These plates act as an RF shield for the center set of plates which are tied together and connected at plate 45 to the center wire 42 of cable 43. This center wire 42 represents the center wires of cables I and J in FIGURE 1 which are tied together and connected to the passenger detector circuit oscillator 19 by wire 28.

It can now be seen that when the seat condenser is placed on a seat and a person sits on it, a downward pressure is applied and the outside plates are compressed closer to the center plates causing an increase in capacity of the condenser. This capacity change is used to control the operation of oscillator 19. Capacity change due to humidity and RF interference are minimized by the outside plates being grounded. To further minimize capacity changes due to humidity the complete seat condenser is sealed in a waterproofing material such as plastic to keep the condenser dielectric dry.

Returning to FIGURE 1, it will now be shown that the seat pals F and G and the detector circuit 32 are entirely tamper proof. The seat pads are housed beneath the seat covers and the detector circuit is housed in the locked control unit H. If either of the pads F or G or the cables I or J are shorted or cut the passenger detector circuit 32 is cut off as follows. The oscillator 19 is preset by coil 26 to a point where the oscillator output is maximum when the system is operating (coarse adjust). The system is further adjusted (fine adjust) by condenser 27 to a point where a small increase in capacity of either of the seat condensers F or G will trigger the oscillator 19 off. It can be seen then that shorting the seat condenser F or G, the cables I or J, will make the circuit inoperative.

While a small decrease in the capacity of condensers F or G will not cut the oscillator 19 off, a large decrease in capacity, such as would be the case if one of the cables I or J was cut, will cause the output of the oscillator 19 to decrease sufficiently to cut the relay driver 21 off. The cutoff point is determined by the biasing of the relay driver 21. It can be seen then that shorting or cutting the seat pads or cables will make the detector circuit inoperative.

All parts of the taxi control system have now been explained except the delay circuit 22 in FIGURE 1. This circuit functions as follows. When oscillator 19 is on, condenser 24 charges up to a potential exceeding that required to turn the relay driver circuit 21 on. When the oscillator is turned off, the charged condenser will keep the relay driver circuit on until the condenser discharges sufficiently through resistor 23 to allow the relay driver stage to cut off. The delay time is determined by the values of condenser 24 and resistor 23. Without the delay circuit, it can be seen that relay 10 would become deenergized as soon as a passenger was seated on pad F or G. This is undesirable since the auto engine would kill before the driver had a chance to get his passengers' destination and turn his meter on.

It can be seen from FIGURE 1 that to install the control system, none of the regular auto system wiring is cut or spliced. Also, when the control unit is removed for repairs (plugs 6, 13, 29 and 31 are removed) the auto ignition system and taximeter circuits will function normally. Thus, the system is designed to be easily installed and maintained.

I claim:

1. In a taxi including an ignition coil, taxi meter, and at least one passenger seat, a taxi control system for rendering the taxi ignition coil inoperative if the taxi meter is not turn on while a passenger is seated in the taxi, comprising, in combination: first and second switch means connected in series with each other between said ignition coil and ground, said first switch means being connected to said taxi meter to open in response to turning on of said taxi meter; a control means responsive to pressure on said passenger seat connected to said second switch means to close said second switch means in response to the presence of a passenger on said seat and open said second switch means in the absence of said passenger whereby if a passenger is present and said taxi meter is not turned on, said ignition coil is grounded through said series connected first and second switch means so that said taxi is inoperative, said control means including an oscillator; a condenser means connected in the feedback path of said oscillator; a rectifier connected to the output of said oscillator; and a driver circuit connected to the output of said rectifier and to said second switch means, said condenser means being disposed under said seat such that pressure thereon increases its capacitance to render said oscillator inoperative and thereby de-energize said driver circuit, said second switch means being held open by said driver circuit when said driver circuit is energized and adapted to close when said driver circuit is de-energized.

2. A control system according to claim 1, in which an increase in said capacitance above a given value renders said oscillator inoperative and a decrease in said capacitance below a given value renders said oscillator inoperative whereby tampering with said control means to change said capacitance outside said given values renders said control system inoperative.

3. A control system according to claim 2, in which said condenser means comprises at least three flexible plates, one above the other, and separated by a compressible dielectric material, the outer plates being connected together to ground and the second plate connecting to said oscillator.

4. A control system according to claim 3, in which said first and second switching means are locked in a metal housing to prevent tampering therewith.

5. In a taxi including a motor, taxi meter, and at least one passenger seat, a taxi control system for rendering said motor inoperative if the tax meter is not registering while a passenger is seated in the taxi, comprising, in combination: switch means; circuit means connected to said switch means, taxi meter, and motor and responsive to closing of said switch means when said meter is not registering, to render said motor inoperative; an oscillator; a condenser means connected in the feedback path of said oscillator; a rectifier connected to the output of said oscillator; and a driver circuit connected to the output of said rectifier and to said switch means, said condenser means being adapted to be disposed under said seat such that pressure thereon increases its capacitance to render said oscillator inoperative and thereby de-energize said driver circuit, said switch means being held open by said driver circuit when said driver circuit is energized and adapted to close when said driver circuit is de-energized, whereby if a passenger is present on said seat and said taxi meter is not registering, said motor is rendered inoperative.

6. A taxi control system according to claim 5, including means responsive to the placing of said meter in registering position for over-riding said circuit means to enable said motor to operate regardless of the position of said switch means.

References Cited by the Examiner

UNITED STATES PATENTS

| | | | |
|---|---|---|---|
| 1,541,544 | 6/25 | Weiss | 180—82 |
| 1,564,038 | 12/25 | Weiss | 180—82 |
| 1,956,317 | 4/34 | Di Bona | 180—82 |
| 2,194,273 | 3/40 | Booth | 180—82 |
| 2,649,579 | 8/53 | Alexander | 317—246 |
| 2,731,100 | 1/56 | Butler | 180—82 |
| 2,866,141 | 12/58 | Frank et al. | 317—246 |
| 2,934,159 | 4/60 | Butler | 180—82 |

A. HARRY LEVY, *Primary Examiner.*

PHILIP ARNOLD, *Examiner.*